Figure 1:
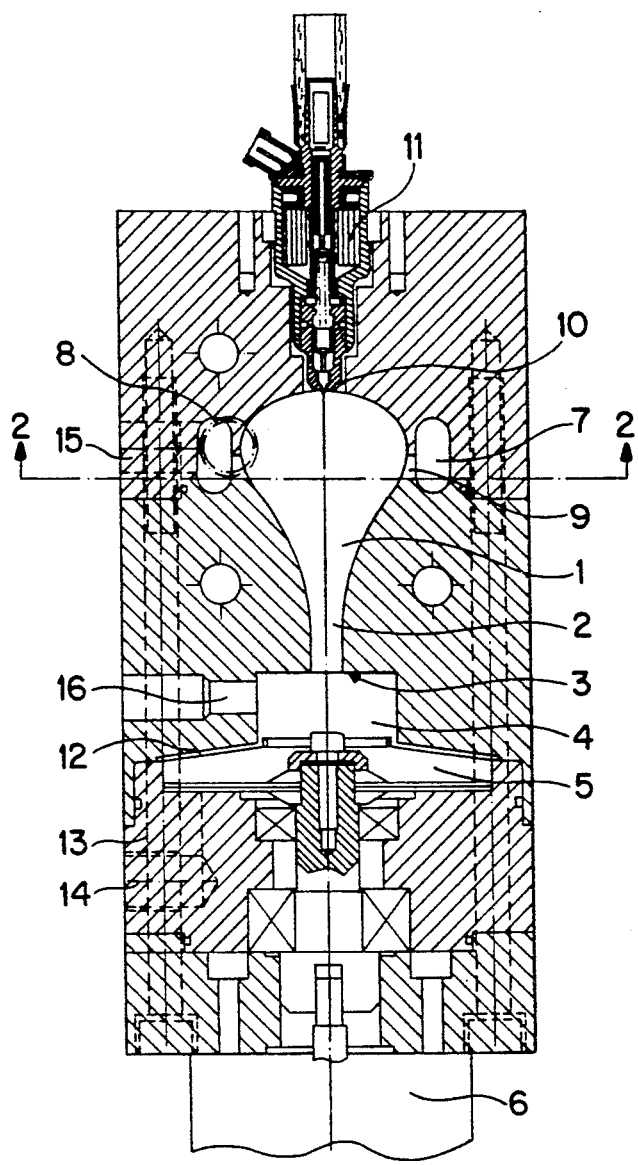

United States Patent [19]

Ulrich et al.

[11] Patent Number: 5,125,367
[45] Date of Patent: Jun. 30, 1992

[54] METHOD AND APPARATUS FOR PRODUCING A WATER-IN-FUEL-EMULSION AND EMULSIFIER-FREE WATER-IN-FUEL-EMULSION

[75] Inventors: Armando Ulrich, Auw; Alfred Kessler, Aarau, both of Switzerland

[73] Assignee: Harrier GmbH, Munich, Fed. Rep. of Germany

[21] Appl. No.: 598,596

[22] PCT Filed: Apr. 12, 1990

[86] PCT No.: PCT/EP90/00584
§ 371 Date: Oct. 19, 1990
§ 102(e) Date: Oct. 19, 1990

[87] PCT Pub. No.: WO90/12959
PCT Pub. Date: Nov. 1, 1990

[30] Foreign Application Priority Data

Apr. 14, 1989 [DE] Fed. Rep. of Germany ....... 3912344

[51] Int. Cl.$^5$ .............................................. F02M 25/02
[52] U.S. Cl. .................. 123/25 E; 123/25 R; 123/25 F; 137/897; 366/134; 366/137; 366/177; 366/262
[58] Field of Search ............... 123/25 A, 25 R, 25 E, 123/25 F; 137/897, 896; 366/134, 136, 137, 262, 177, 179

[56] References Cited

U.S. PATENT DOCUMENTS

| | | | |
|---|---|---|---|
| 3,606,868 | 9/1971 | Voogd | 123/25 R |
| 4,388,893 | 6/1983 | Apfel | 123/25 E |
| 4,412,512 | 11/1983 | Cottell | 123/25 R |
| 4,696,279 | 9/1987 | Lindberg | 123/25 R |
| 4,831,971 | 5/1989 | Ott et al. | 123/25 A |
| 4,938,606 | 7/1990 | Kunz | 366/134 |

FOREIGN PATENT DOCUMENTS

| | | |
|---|---|---|
| 0263443 | 4/1988 | European Pat. Off. . |
| 0312641 | 4/1989 | European Pat. Off. . |
| 3123743 | 3/1982 | Fed. Rep. of Germany . |
| 3405899 | 9/1985 | Fed. Rep. of Germany . |
| 3504699 | 8/1986 | Fed. Rep. of Germany . |
| 8905075 | 10/1989 | Fed. Rep. of Germany . |

*Primary Examiner*—Andrew M. Dolinar
*Attorney, Agent, or Firm*—Beveridge, DeGrandi & Weilacher

[57] ABSTRACT

Method and apparatus for producing a water-in-fuel-emulsion and emulsifier-free water-in-fuel-emulsion. The apparatus for generating a fuel water emulsion for the operation of an injection pump, particularly that of a diesel motor, comprising a rotationally symmetric vortex chamber (1) with a tangential inlet and a tapering axial outlet. In order to generate a fine homogeneous emulsion in colloidal state, having a size of the suspended water droplets of 1000 nm or less, the axial end portion of the vortex chamber (1) facing away from the outlet is surrounded by a ring channel (7) running coaxially to the vortex chamber (1), the ring channel (7) being connected to the vortex chamber (1) via inlet slots (9) which are tangentially aligned to it and in which a fuel inlet channel (8) tangentially ends. An electromagnetically controlled water injection nozzle (10) leads into the end portion of the vortex chamber (1) at the inlet side thereof. The outlet (2) of the vortex chamber (1) opens via an enlargement (3) into a suction chamber (4) of a radial wheel (5) which is arranged in a pump chamber (12) having an outlet channel (13) in the area of the circumference of the radial wheel (5) to which a forward conduit leading to the injection pump and a recirculation conduit leading to an emulsion inlet channel (15) are connectable which also ends tangentially into the ring channel (7). An intake channel (16), to which a return conduit coming from the injection pump is connectable, leads into the suction chamber (4) of the radial wheel (5).

26 Claims, 2 Drawing Sheets

METHOD AND APPARATUS FOR PRODUCING A WATER-IN-FUEL-EMULSION AND EMULSIFIER-FREE WATER-IN-FUEL-EMULSION

The invention refers to a method and apparatus for producing a water-in-fuel-emulsion, the apparatus comprising a rotationally symmetric vortex chamber with a tangential inlet and a tapering axial outlet. Further, the invention refers to a water-in-fuel emulsion produceable by the method.

It is known that by adding water to diesel fuel the operating temperature of the motor and the nitrogen monoxide portion and the soot portion in the exhaust gas can be reduced. A comparable conclusion is also valid for oil burners. However, to achieve this it is decisive that the diesel fuel and the water are transferred to the form of an emulsion in which smallest water droplets are suspended in the diesel fuel. For this reason it has already been proposed to introduce a premixed fuel water mixture tangentially into a rotationally symmetric vortex chamber tapering continuously towards its axial outlet with which a channel tapering in direction of the flow is connected via a stepped enlargement. The channel terminates in a second nearly pear-shaped vortex chamber whose axis is perpendicular to that of the first vortex chamber. Also the second vortex chamber tapers towards its axial outlet and ends there at the suction side of a pump wheel from which the liquid mixture is delivered to a compensation chamber surrounding the first vortex chamber and is fed back therefrom into the first vortex chamber through tangential intake openings at the transition of the first vortex chamber into the outlet of said vortex chamber. This cycle is passed through by the liquid mixture at least ten times such that an emulsion with droplets suspended in the fuel and having an average size of 3 to 6 micron is created. A corresponding emulsion portion is branched off from the cycle in the area of the biggest circumference of the second vortex chamber to the injection pump of the diesel motor and fresh premixed fuel and water are —as also the remaining emulsion not used up in the injection pump—introduced into the system at the suction side of the pump wheel.

It is an object of the present invention to provide a method for producing a water-in-fuel-emulsion and a water-in-fuel-emulsion produceable by said method and having very fine water droplets evenly distributed in the emulsion.

It is a further object of the present invention to provide an apparatus of the present kind which is relatively simply designed and yet highly effective for the generation of the emulsion.

The method for producing a water-in-fuel-emulsion comprises introducing water and fuel, supplied in dosed quantities, into a flow vortex rotating about an axis and mixing the water and the fuel in said vortex to obtain a mixture thereof which is accelerated along said axis, whereafter the rotating mixture is suddenly decelerated and thereafter recirculated into the flow vortex. According to the invention, the water and the fuel are separately introduced into said flow vortex, the water being introduced into said vortex by high pressure atomization, said mixture being compressed in a circulating pump after being decelerated and before being recirculated.

The emulsifier-free water-in-fuel-emulsion of water droplets dispersed in the fuel and produceable by the method, wherein the amount of water in the emulsion falls in the range of 5 to 35 Vol%, is characterized according to the invention by being a stable colloid with a water droplet size of 1000 nm or less.

Further, the apparatus of the invention, having the construction as mentioned at the beginning of the present specification is characterized in that the axial end portion of the vortex chamber facing away from the outlet is surrounded by a ring channel running coaxially or spirally to the vortex chamber, the ring channel being connected to the vortex chamber via inlet slots which are at least approximately tangentially aligned to it and in which a fuel inlet channel tangentially ends, in that an electromagnetically controlled water injection nozzle leads into the ring channel or—preferably—into the end portion of the vortex chamber at the inlet side, in that the outlet of the vortex chamber opens via an enlargement into the suction chamber of a radial wheel which is arranged in a pump chamber having an outlet channel in the area of the circumference of the radial wheel to which a forward conduit leading to an consuming device or a storage, especially to the injection pump of a diesel engine, and a recirculation conduit leading to an emulsion inlet channel are connectable, said emulsion inlet channel also opening tangentially into the ring channel, and in that an intake channel, to which a return conduit coming from the consuming device or storage is connectable, leads into the suction chamber of the radial wheel.

Consequently, in the apparatus according to the invention, the fresh water is not premixed with the fuel but it is fed e.g. to the injection nozzle with a relatively high pressure of, for example, 5.5 to 6.5 bar and from there it is atomized into the ring channel or preferably directly into the vortex chamber. Thereby the water is already fragmented into relatively small droplets which are further reduced in the rotating turbulent flow due to the expansion at the intake into the suction chamber and in the pump flow of the radial wheel and are distributed in the fuel. The feedback of the major part of the mixture leaving the outlet channel of the pump chamber into the ring channel and from there into the vortex chamber serves for the homogenisation of the emulsion, whereas the emulsion portion not used up by the injection pump is resucked into the emulsion circuits via the suction chamber of the radial wheel.

The rotating turbulent flow is propelled due to the pressure of the fuel delivered with a fuel pump into the ring channel and of the emulsion portion repumped from the radial wheel into the ring channel, so that if the pump pressures are appropriately chosen a strong vortex with relatively small losses can be achieved. Further, due to the proposal according to the invention that the fresh fuel as well as the recirculated emulsion portion are fed not directly at the suction side of the radial wheel but into the vortex head in the vortex chamber, the suction pressure, being influenced by the design of the outlet of the vortex chamber, of the emulsion flowing out of the vortex chamber and thereby expanding is not disturbed, so that the radial wheel can be designed for a high pressure ratio between the exit pressure and the intake pressure for improving the generation of the emulsion.

With the apparatus according to the invention it can be achieved in dependence on the layout of the drives and the structural layout of the flow cross sections that the average droplet size of the water in the emulsion is 1000 nm or even 100 to 200 nm, the emulsion having the state of a stable colloid, the colloidal particles showing a vigorous Brownian movement when observed with a ultramicroscope, and the colloidal state of the emulsion is further confirmed by the existance of a Tyndal phenomenon.

The water injection nozzle shall end at such a location of the ring channel (FIG. 3, water injection nozzle 11') or the vortex chamber (FIG. 1, water injection nozzle 11) that an atomization as fine as possible of the injected water is achieved. Due to the pressure conditions present in the whirling in the vortex chamber, it is therefore preferred to let the water injection nozzle end in the axis of the whirling, although it may also be suitable to arrange the water injection nozzle for an injection at an angle to the axis of the whirling.

Also the axis of the radial wheel can be positioned at an angle to the axis of the vortex in the vortex chamber. Here, however, it is also preferred to arrange the radial wheel and its rotationally symmetric suction chamber coaxial to the vortex chamber in order to help to propel the whirling due to the motion of rotation of the radial wheel.

The enlargement at the inlet in the suction chamber of the radial wheel is preferably of stepped design in order to achieve the strongest possible expansion and turbulence of the flow leaving the vortex chamber at this location.

The rotationally symmetric vortex chamber itself can be designed mainly in the shape of a hollow cylinder or in the shape of a hollow heart in the axial section. However, it is preferred to design the vortex chamber in the shape of a hollow pear. Further it is preferred to arrange the outlet channel of the pump chamber parallel to the axis of the radial wheel because the flow leaving the radial wheel is thereby subject to a rough change in its direction which can facilitate fineness of the generation of the emulsion.

It is preferred to operate the water injection nozzle discontinuously. By this measure the fine atomization of the injected water and the mixing of the atomized water droplets is supported.

Due to the injection of the water into the fuel via an electromechanically controlled injection nozzle in accordance with the invention, the possibility arises to control the amount of injected water and thereby the quota of the water in the emulsion being fed to the injection pump of the motor in dependence on the operating state of the motor. It is true that a certain inertia arises up to the point where the control becomes effective due multiple circulation through the emulsifying cycle. However this control inertia can be kept small by the choice of a high pressure ratio between the inlet and the outlet of the vortex chamber which results in an accordingly small period of the recirculation cycle. Concerning the operation of the diesel motor with pure fuel without adding water, it is further possible to branch off the diesel fuel before its intake into the ring channel toward the injection pump of the motor by providing bypass conduits and controlled magnetic valves. Therewith the emulsion circulation is separated from the injection pump.

If a discontinuous operation of the water injection nozzle is provided, such a control of the water content in the emulsion can be effected through the length and the distances of the opening intervals of the injection nozzle, whereby travel of the nozzle valve is kept constant. The number of revolutions of the motor is preferably applied as regulating variable. However it is preferred to use as additional regulating variable the load condition of the motor determined by the actual position of the throttle pedal of the vehicle, or the position of the control rod of the injection pump, the barometric environmental pressure and/or the specific weight of the used fuel. The barometric pressure is measured via a barometric cell which gives the command to the electronic control device to inject more water in case of a high barometric pressure and less water in case of a low barometric pressure. Thereby it is prevented that a decrease of performance occurs due to the water content in the fuel being too high if, for example, a pass is traversed. The specific weight of the supplied fuel can be determined with a balance inserted into the fuel supply conduit. More water is injected in case of a fuel with a high specific weight as compared to a fuel with a low specific weight.

Figure 3:
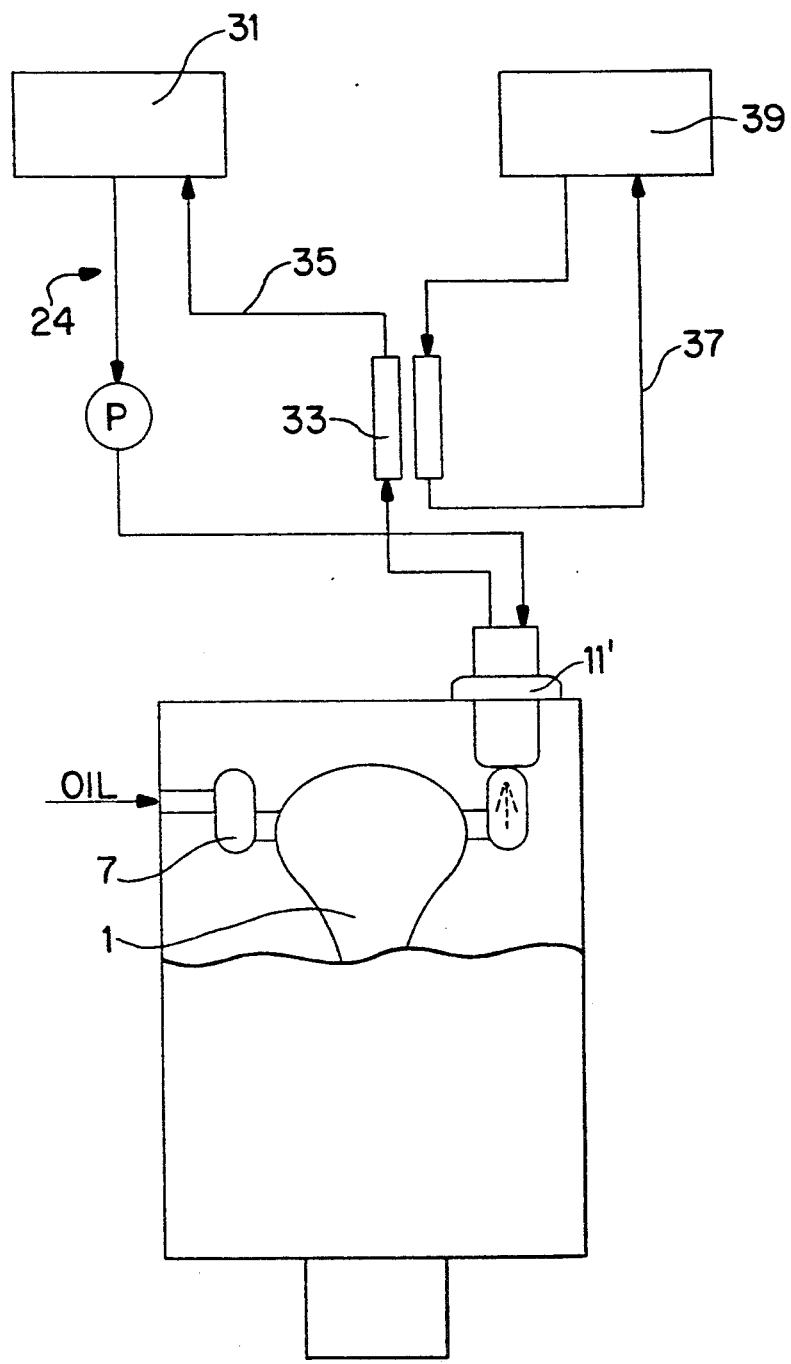

As shown in FIG. 3, water is delivered to the injection nozzle (11, 11') out of a separate water container 31 preferably using a high pressure pump P. Thereby a water circulation cycle 24, a high flow rate of for instance 120 l/h to which the water injection nozzle is connected, can be provided. The return flow into the water container is very high because even during the operation of the biggest motors not more than 40 l/h are used. Preferably this is in that, a heat exchanger 33 which is heated by the cooling water 37 of the vehicle motor 39 is arranged in the return flow branch 35 of the water circulation cycle. Thereby the water fed back into the water container is heated. This heating of the water serves as an antifreezing measure as long as the vehicle is in operation.

In the following the invention is explained by means of a preferred embodiment of the apparatus according to the invention which generates the fuel water emulsion. In the drawing shows:

FIG. 1 a section along the axis of the apparatus and

Figure 2:
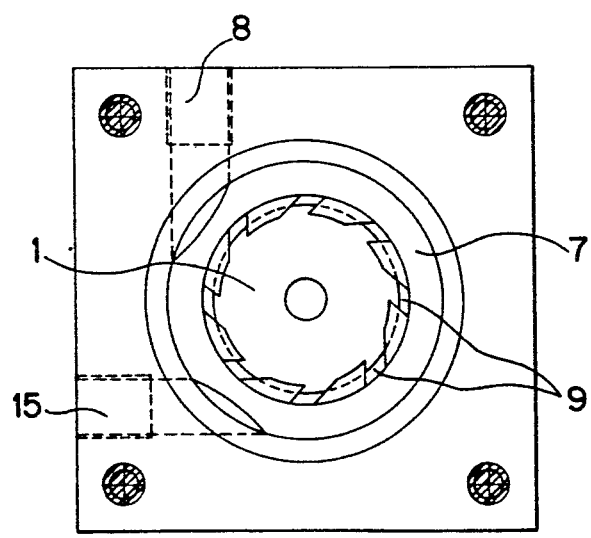

FIG. 2 a cross section along the section line A—A in FIG. 1 in a slightly enlarged scale.

FIG. 3 shows an embodiment of the apparatus with the water injection nozzle located at the ring channel.

The apparatus is composed of a plurality of formed casing boxes bolted to each other. The apparatus encloses a rotationally symmetric, hollow pear-shaped vortex chamber 1 having an exponentially tapering outlet 2 which leads via a stepped enlargement 3 to the suction chamber 4 of a radial pump wheel 5 which is driven by an electric motor 6. The pear-shaped head of the vortex chamber 1 is surrounded by a ring channel 7 in which a fuel inlet channel 8 tangentially ends and which itself leads to the vortex chamber 1 via inlet slots 9 tangentially aligned to the vortex chamber 1. At the crest of the hollow pear-shaped vortex chamber 1 a water injection nozzle 10 ends in the axis thereof which is controlled by an electromagnet 11 in such a manner that the supplied water is discontinuously atomized into the whirling in the vortex chamber 1.

The vortex chamber 1, the cylindrical suction chamber 4 and the radial wheel are coaxially aligned to each other. The pump chamber 12 which houses the radial wheel 5 opens in the area of the circumference of the radial wheel 5 into an outlet channel 13 running parallel to its axis. The outlet channel 13 angularly passes over to a connection bore 14 for the connection of a T-piece. One branch of the T-piece leads to the injection pump of a diesel motor and the other branch of the T-piece leads via a recirculation conduit to an emulsion inlet channel 15 which also opens tangentially into the ring channel 7. The reverse conduit of the injection pump is connected to an intake channel 16 opening laterally into the suction chamber 4.

In operation of the apparatus, the fuel is delivered by a fuel pump with, depending on the type of vehicle, 1.5 to 3.0 bar through the fuel inlet channel 8 into the ring channel 7 from where the fuel is fed through the inlet slots 9 into the vortex chamber 1 and is imparted a circular spiral motion. The water is supplied to the water injection nozzle 10 by a high pressure pump, particularly a gearwheel high pressure pump, which can electrically or mechanically be driven by the motor and generates, for example, a pressure of 10 bar being reduced by a pressure reducing valve to 5,5 to 6,5 bar depending on the motor and is atomized via the water injection nozzle 10 into the whirling generated in the vortex chamber 1. The injection nozzle is operated electromechanically. The jet needle is pressed by a helical spring on its seat if the magnet winding of the electric magnet 11 is without current. The jet needle is lifted from its seat, for instance by about 0.1 mm, by the current impulse for the magnet winding. The water flows out of the water injection nozzle 10 through the created annular gap during, for example, 1 to 1.5 ms. For purposes of better atomization the valve needle can be provided with a spray needle.

The rotating turbulent flow is accelerated in the tapering outlet 2 of the vortex chamber 1 which causes the pressure to drop correspondingly. The flow conditions are preferably adjusted such that, at the exit out of the outlet 2 into the suction chamber 4, the steam pressure is not quite reached so that the cavitation state is approached as near as possible but without reaching it. Due to the stepped enlargement 3, the flow expands during the change-over to the suction chamber 4 and is then taken in by the radial wheel 5 and is expanded radially outwardly in it. Due to the coaxial arrangement of the radial wheel 5 to the vortex chamber 1 the propelling of the rotating turbulent flow in the vortex chamber 1 is promoted by the suction pressure of the radial wheel 5. The radial wheel 5 is driven by the electric motor 5, preferably with a constant number of revolutions of, for example, 3000 r.p.m. The centrifugal pump formed with the radial wheel 5 has, for instance, a hourly performance of 240 l at a suction height of 1,5 m.

The emulsion leaves the pump chamber 12 through the outlet channel 13 and the connection bore 14 and is divided thereafter by the T-piece. One part is fed to the injection pump whereas the larger part is reintroduced into the ring channel 7 and therewith into the vortex chamber 1 via the recirculation conduit and the emulsion inlet channel 15. The part of the emulsion not used up by the injection pump is resucked by the radial wheel 5 into the circulation circuit via the intake channel 16.

The formation of the emulsion mainly takes place in the rotating turbulent flow in the vortex chamber 1. It is essentially supported, however, by the injection and atomization of the water due to the water injection nozzle 10 and by the flow conditions in the radial wheel 5.

Due to the generation of the emulsion according to the invention it is not only achieved that the nitrogen monoxide portion and the soot portion in the exhaust gas of the diesel motor are considerably reduced but also a reduction of the particle size in the exhaust gas is achieved. Moreover the smell of the exhaust gas is substantially improved, which means that the smell of the gas is less objectionable to normal exhaust gases of diesel motors.

We claim:

1. A method for producing a water-in-fuel-emulsion, comprising introducing water and fuel, supplied in dosed quantities, into a flow vortex rotating about an axis and mixing the water and the fuel in said vortex to obtain a mixture thereof which is accelerated along said axis, whereafter the rotating mixture is suddenly decelerated and thereafter is recirculated into the flow vortex, characterized in that the water and the fuel are separately introduced into said flow vortex, the water being introduced into said vortex by high pressure atomization, and in that the mixture is compressed in a circulating pump after being decelerated and before being recirculated.

2. Apparatus for producing a water-in-fuel-emulsion, especially for the operation of an injection pump, particularly that of a diesel motor, comprising a rotationally symmetric vortex chamber (1) with a tapering axial outlet (2), characterized in that the axial end portion of the vortex chamber (1) facing away from the outlet is surrounded by a ring channel (7), the ring channel (7) being connected to the vortex chamber (1) via inlet slots (9) which are, at least approximately, tangentially aligned to said vortex chamber and in which a fuel inlet channel (8) tangentially ends, in that a water injection nozzle (10) supplied atomized water to a location downstream from the end of the fuel inlet channel and upstream from the outlet of the vortex chamber, in that the outlet (2) of the vortex chamber (1) opens via an enlargement (3) into a suction chamber (4) of a radial wheel (5) which is arranged in a pump chamber (12) having an outlet channel (13) in the area of the circumference of the radial wheel (5) for connection of a recirculation line leading to an emulsion inlet channel (15), said emulsion inlet channel (15) also opening tangentially into the ring channel (7).

3. Apparatus according to claim 2, characterized in that the water injection nozzle (10) opens coaxially into the end portion of the vortex chamber (1) at the inlet side thereof.

4. Apparatus according to claim 2, characterized in that the radial wheel (5) and its rotationally symmetrically designed suction chamber (4) are arranged coaxially in respect to the vortex chamber (1).

5. Apparatus according to claim 2, characterized in that the enlargement (3) at the intake into the suction chamber (4) of the radial wheel (5) is of stepped embodiment.

6. Apparatus according to claim 2, characterized in that the vortex chamber (1) has the shape of a hollow pear.

7. Apparatus according to claim 2, characterized in that the outlet channel (13) of the pump chamber (12) runs parallel to the axis of the radial wheel (5).

8. Apparatus according to claim 2, characterized in that the water injection nozzle (10) includes means for operating discontinuously.

9. Apparatus according to claim 8, characterized in that said means for operating discontinuously includes a jet needle and said means for operating discontinuously operates such that the opening intervals of the water injection nozzle (10), with constant travel of the jet needle, are controlled in dependence on the number of revolutions of the motor.

10. Apparatus according to claim 9, characterized in that said means for operating discontinuously operates such that the opening intervals of the water injection nozzle (10) are further controlled in dependence on the position of an accelerator pedal or of a control rod of an injection pump, barometric environmental pressure and/or specific weight of the fuel.

11. Apparatus according to claim 2, characterized in that the water injection nozzle (10) is connected to a water circulation cycle, in the return branch of which is arranged a heat exchanger heated by the cooling water of the motor.

12. An apparatus as recited in claim 2, wherein said water injection nozzle is positioned so as to open into said ring channel.

13. An apparatus for producing a water-in-fuel a structure having a rotationally symmetric vortex chamber formed therein, said vortex chamber including an inlet end, an outlet end and a central axis extending between the inlet and outlet ends, said structure further including a ring channel which surrounds an inlet end of said vortex chamber and has a central axis in common with the central axis of said vortex chamber, and said structure also having formed therein slots which extend from said ring channel and open into said vortex chamber, and said slots being tangentially orientated with respect to said vortex chamber;

a fuel inlet conduit having an end opening into said ring channel, and said fuel inlet conduit being tangentially arranged with respect to said ring channel;

water-injection means for injecting water into said vortex chamber said water injection means being dimensioned and arranged so as to introduce water into a vacuum are a formed within said vortex chamber due to a vortex circulation within said vortex chamber of fuel previously introduced through said fuel conduit, through said slots, and into said vortex chamber;

said structure further including an expansion chamber into which opens the outlet end of said vortex chamber;

said structure also having a pump chamber which is in fluid communication with said expansion chamber and an outlet channel which is in fluid communication with said pump chamber; and pumping means for pumping a mixture of fuel and water exiting the outlet end of said vortex chamber through said pump chamber and into said outlet channel.

14. An apparatus as recited in claim 13 wherein said water injection means includes means for atomizing the water being injected into said vortex.

15. An apparatus as recited in claim 14 wherein said water injection means includes dosing means for injecting the water into said vortex chamber in doses.

16. An apparatus as recited in claim 13 wherein said water injection means includes dosing means for injecting the water into said vortex in doses.

17. An apparatus as recited in claim 13 wherein said vortex chamber is pear-shaped with a bulbous inlet end and a tapering channel forming the outlet end of said vortex chamber.

18. An apparatus as recited in claim 13 wherein said water injection means includes an injection nozzle having a central axis in common with the central axis of said vortex chamber.

19. An apparatus as recited in claim 13 further comprising a recirculation conduit having an inlet which is adapted to receive fluid exiting said outlet channel and an outlet end which opens into said ring channel, and the outlet end of said recirculation conduit being tangentially arranged with respect to said ring channel.

20. An apparatus as recited in claim 19 wherein said structure has formed therein an inlet channel which has one end opening into said expansion chamber that is positioned downstream from the outlet end of said vortex chamber and upstream from said outlet channel.

21. An apparatus as recited in claim 13 wherein said structure has formed therein an inlet channel which has one end opening into said expansion chamber that is positioned downstream from the outlet end of said vortex chamber and upstream said outlet channel.

22. An apparatus as recited in claim 13 wherein said pump means includes a radial pump wheel and means for rotating said radial pump wheel, said radial pump wheel being dimensioned and arranged for rotation within said pump chamber, and said radial pump wheel having an axis of rotation coaligned with the central axis of said vortex chamber.

23. An apparatus as recited in claim 22 wherein said water injection means includes an injection nozzle having a central axis coaligned with the central axis of said vortex chamber.

24. Apparatus for producing a water-in-fuel-emulsion, comprising a rotationally symmetric vortex chamber (1) with a tapering axial outlet (2), characterized in that the axial end portion of the vortex chamber (1) facing away from the outlet is surrounded by a ring channel (7), the ring channel (7) being connected to the vortex chamber (1) via inlet slots (9) which are essentially tangentially aligned to said vortex chamber and said apparatus further comprising a fuel inlet channel (8) which tangentially ends within said ring channel, in that a water injection nozzle (10) supplies atomized water to a location downstream from the end of the fuel inlet channel and upstream from the outlet end of the vortex chamber, in that the outlet (2) of the vortex chamber (1) opens via an enlargement (3) into a suction chamber (4) of a radial wheel (5) which is arranged in a pump chamber (12) having an outlet channel (13) in the area of the circumference of the radial wheel (5) for connection of a recirculation line leading to an emulsion inlet channel (15), said emulsion inlet channel (15) also opening tangentially into the ring channel (7).

25. An apparatus as recited in claim 24, wherein said water injection nozzle is positioned so as to open into said ring channel.

26. An apparatus as recited in claim 24, wherein said water injection nozzle is positioned so as to open coaxially into the end portion of the vortex chamber at the inlet.

* * * * *

UNITED STATES PATENT AND TRADEMARK OFFICE
CERTIFICATE OF CORRECTION

PATENT NO. : 5,125,367
DATED : June 30, 1992
INVENTOR(S) : Ulrich, et al.

It is certified that error appears in the above-identified patent and that said Letters Patent is hereby corrected as shown below:

In Col. 7, line 16, add --emulsion, comprising:-- after "water-in-fuel".

Signed and Sealed this

Fourteenth Day of September, 1993

*Attest:*

BRUCE LEHMAN

*Attesting Officer*     Commissioner of Patents and Trademarks